(12) United States Patent
Messner

(10) Patent No.: US 10,844,968 B2
(45) Date of Patent: Nov. 24, 2020

(54) MULTIPLE PORT DISTRIBUTION MANIFOLD

(71) Applicant: William Messner, Downers Grove, IL (US)

(72) Inventor: William Messner, Downers Grove, IL (US)

(*) Notice: Subject to any disclaimer, the term of this patent is extended or adjusted under 35 U.S.C. 154(b) by 0 days.

(21) Appl. No.: 14/354,225

(22) PCT Filed: Oct. 29, 2012

(86) PCT No.: PCT/IB2012/055977
§ 371 (c)(1),
(2) Date: Apr. 25, 2014

(87) PCT Pub. No.: WO2013/064962
PCT Pub. Date: May 10, 2013

(65) Prior Publication Data
US 2016/0377188 A1 Dec. 29, 2016

(51) Int. Cl.
| A62B 7/02 | (2006.01) |
| A62B 7/04 | (2006.01) |
| B63C 11/02 | (2006.01) |
| B63C 11/08 | (2006.01) |
| B63C 11/12 | (2006.01) |
| B63C 11/14 | (2006.01) |
| B63C 11/18 | (2006.01) |
| B63C 11/22 | (2006.01) |
| F16K 11/085 | (2006.01) |

(52) U.S. Cl.
CPC ............ *F16K 11/085* (2013.01); *A62B 7/02* (2013.01); *A62B 7/04* (2013.01); *B63C 11/02* (2013.01); *B63C 11/08* (2013.01); *B63C 11/12* (2013.01); *B63C 11/14* (2013.01); *B63C 11/18* (2013.01); *B63C 11/22* (2013.01)

(58) Field of Classification Search
CPC ..................................................... F16K 11/085
USPC ............................. 137/625.47; 251/192, 309
See application file for complete search history.

(56) References Cited

U.S. PATENT DOCUMENTS

| 200,383 A * | 2/1878 | Fischer | F16K 11/074 |
| | | | 137/625.11 |
| 1,849,259 A * | 3/1932 | Walker | F16K 11/085 |
| | | | 137/616.5 |
| 2,387,013 A * | 10/1945 | Fuller | B29C 45/14754 |
| | | | 137/375 |

(Continued)

FOREIGN PATENT DOCUMENTS

WO     2008014987      2/2008

*Primary Examiner* — Mary E McManmon
*Assistant Examiner* — Daphne M Barry

(57) ABSTRACT

A mountable Multiple Port Distribution Manifold consisting of a selector knob through which a gas of liquid media may internally flow, between a hollow port at one end and a side port of the rotatable Shaft within the Manifold. By rotating the Knob/Shaft, the side hole port of the Knob/Shaft assembly may selectively intersect with multiple ports within the Manifold. Said assembly also provides of an "off" position, where no Shaft/Manifold intersection allows port to port connection. The invention may be constructed of any suitable material, natural or synthetic, that is sufficiently strong to withstand the internal pressures of a gas or liquid media routed within without leakage.

2 Claims, 4 Drawing Sheets

(56) References Cited

U.S. PATENT DOCUMENTS

| | | | | |
|---|---|---|---|---|
| 2,700,984 A | * | 2/1955 | Gleasman | F15B 13/06 137/614.17 |
| 2,898,937 A | * | 8/1959 | Williams | F16K 11/085 137/613 |
| 3,693,653 A | | 9/1972 | Cramer | |
| 3,780,758 A | * | 12/1973 | DeVries | F16K 3/08 137/454.6 |
| 3,892,259 A | * | 7/1975 | McClocklin | F16K 11/0743 137/625.21 |
| 4,169,491 A | * | 10/1979 | Bajka | F16K 11/085 126/563 |
| 4,298,026 A | * | 11/1981 | Ambers | F16K 11/085 137/265 |
| 4,328,798 A | | 5/1982 | Isaacson | |
| 4,392,490 A | | 7/1983 | Mattingly | |
| 4,449,524 A | | 5/1984 | Gray | |
| 4,520,766 A | | 6/1985 | Akeroyd | |
| 4,812,083 A | * | 3/1989 | Mosier | B63C 11/2245 405/185 |
| 4,838,256 A | | 6/1989 | Miltz | |
| 4,841,953 A | | 6/1989 | Dodrill | |
| 4,958,660 A | * | 9/1990 | Eke | F16K 11/0856 137/625.11 |
| 4,967,787 A | * | 11/1990 | Taylor | F16K 3/08 137/316 |
| 5,020,568 A | * | 6/1991 | Taylor | F16K 3/08 137/316 |
| 5,123,449 A | * | 6/1992 | Nowicki | F16K 11/085 137/625.11 |
| 5,159,924 A | * | 11/1992 | Cegielski | A61M 16/104 128/203.12 |
| 5,273,030 A | | 12/1993 | Crome | |
| 5,293,864 A | * | 3/1994 | McFadden | A62B 7/02 128/201.29 |
| 5,411,018 A | * | 5/1995 | Rinehart | A62B 7/02 128/201.27 |
| 5,584,289 A | | 12/1996 | Wise | |
| 5,678,542 A | | 10/1997 | Maffatone | |
| 6,070,577 A | | 6/2000 | Troup | |
| 6,227,199 B1 | | 5/2001 | Garofalo | |
| 6,513,525 B2 | | 2/2003 | Chen | |
| 6,843,466 B1 | * | 1/2005 | Chuang | B25F 5/00 251/207 |
| 7,168,428 B1 | | 1/2007 | Zoha | |
| 8,739,818 B1 | * | 6/2014 | Woods | F16K 11/074 137/454.6 |
| 8,770,195 B2 | * | 7/2014 | Stone | B63C 11/186 128/205.24 |
| 2002/0189692 A1 | * | 12/2002 | Sato | F16K 11/0853 137/625.47 |
| 2005/0022885 A1 | | 2/2005 | Marty | |
| 2011/0071390 A1 | * | 3/2011 | Liu | A61B 6/481 600/431 |

* cited by examiner

FIGURE 4
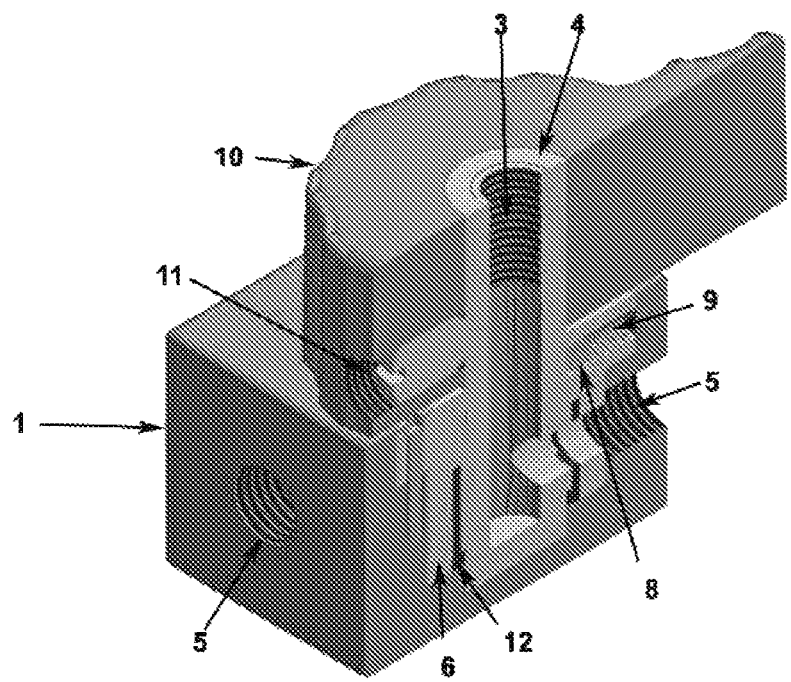
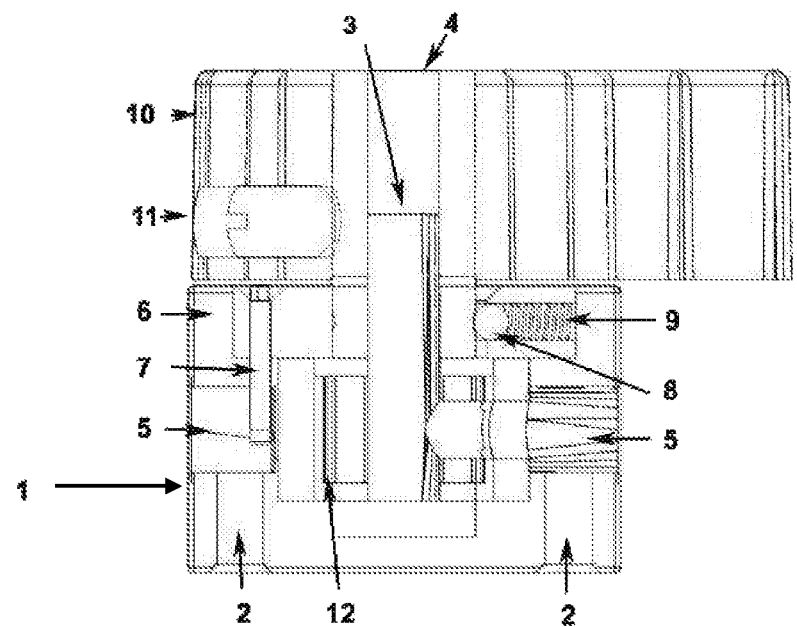
FIGURE 5

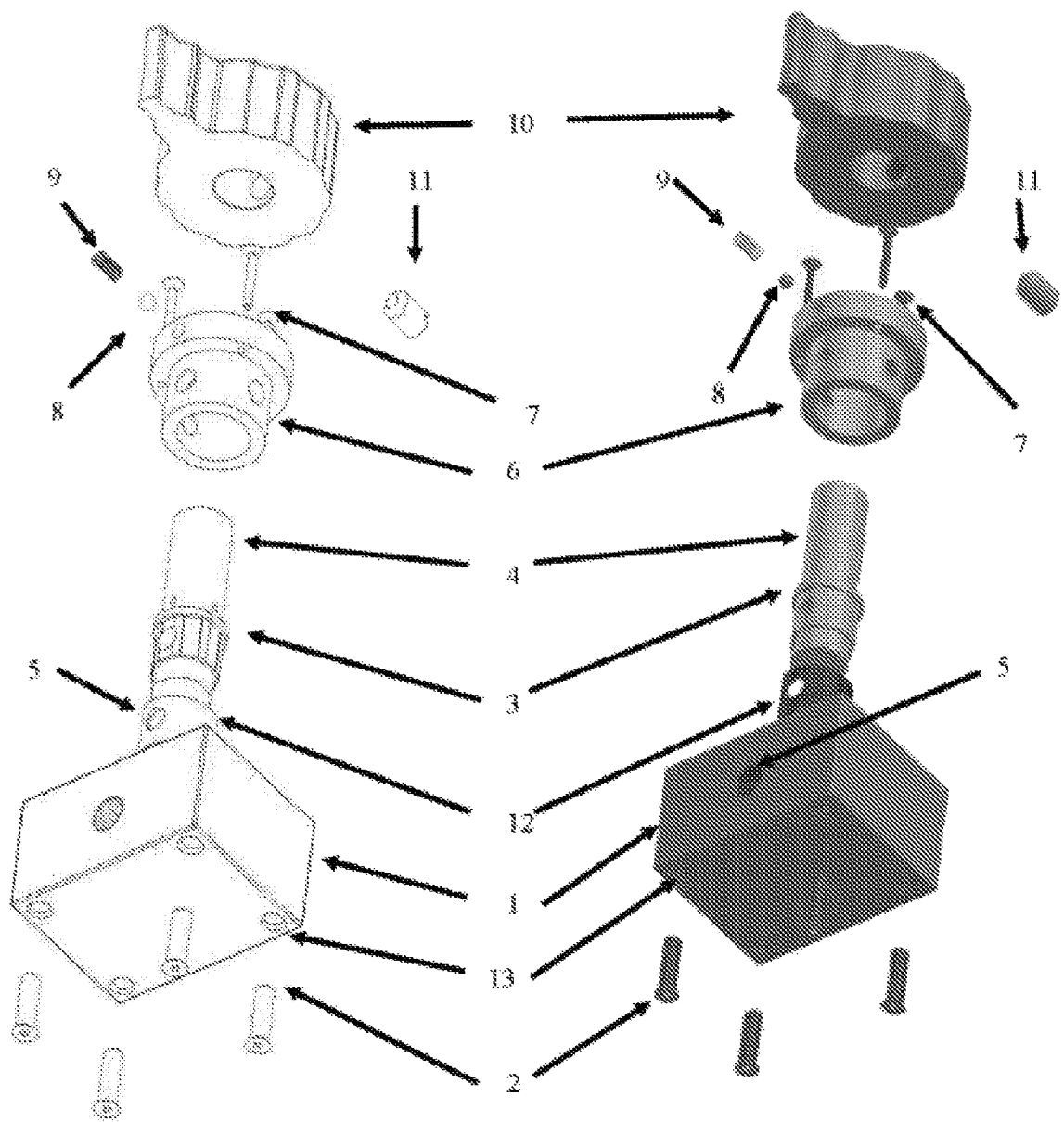

MULTIPLE PORT DISTRIBUTION MANIFOLD

CROSS-REFERENCE TO RELATED APPLICATIONS

This Application claims the benefit of provisional patent applications:
Ser. No. 61/553,215 FILED ON Oct. 30, 2011

FEDERALLY SPONSORED RESEARCH

None

SEQUENCE LISTING

None

BACKGROUND

Field of Invention

This invention relates to the distribution of gas or fluid from one of a plurality of ports to a single port, or distribution of gas or fluid from one port to one of plurality ports.

General

This invention relates to the attachment, interconnection, selection and distribution of multiple gas/fluid sources to destinations, within a single device. Depending upon the direction of flow the invention may either be used to a) route one [selected from a plurality] gas/liquid ["media"] "in" port to a single "out", or; b) route a single gas/liquid ["media"] "in" port to one of a plurality of "out" ports.

A definitive feature of the invention is the passage of the media through the rotatable Selector Knob/Shaft ["Knob/Shaft"] assembly to the single port. Said "Shaft" is hollow, with a opening at one end that is exterior to the manifold. A second opening appears on the side surface of the shaft, interior to the manifold. Selection of which single port, of the plurality available, will be selected and aligned with the interior opening to the shaft, is accomplished by rotating the Knob/Shaft assembly to the desired alignment. This rotational operation effectively selects the two ports (from/to) through with the media will be routed, within a unique, compact design configuration. It simultaneously routes said media internally through a predetermined change in direction without the use of additional externally connected "swivels." Lastly, the Shaft/Knob may also rotate to a position where no in/out port alignment exists, thereby creating an "off" position, through which no media may flow.

Application I: from Choice of Many to One

By way of example [and not limitation as to the variety of applications for which the invention may be suited], this invention may be used by persons in adverse environments where, in the event of a stoppage of the main media supply, the user may quickly rotate the Shaft/Knob assembly to select an alternative source from one of a plurality of alternative "in" sources. The media is internally redirected at a predetermined angle, from in to out, or may be shut off entirely.

Application II: from One to Choice of Many

Where the flow of media is opposite of Application I, the user may distribute media from a single "in" port to one of a plurality of "out" ports by rotating the Shaft/Knob assembly to selectively route the single "in" source to one of a plurality of alternative "out" destinations. The media is internally redirected at a predetermined angle, from in to out, or may to shut off entirely.

In conclusion, insofar as I am aware, no device formerly developed provides as simple, elegant and reliable design solution for the immediate selection from or distribution to alternative gas/fluid ["media"] sources/destinations.

BACKGROUND OF MULTIPORT DISTRIBUTION MANIFOLD

In the following description, certain terms will be used for brevity, clarity, and understanding, but no unnecessary limitations are to be implied therefrom beyond the requirements of the prior art, because such words are used for description purposes herein and are intended to be broadly construed. Furthermore, the embodiments of the system illustrated and described herein are by way of example, and the scope of the invention is not limited to the exact details of construction and use. They represent the general design characteristics of the invention and not the manufacturing details or applicable uses of the final production product. Shapes, sizes and fit will change in response to the requirements of various applications. Many other variations are possible with the teachings of the various embodiments.

Example Application of Use

This invention may be used by persons both underwater (SCUBA) and terrestrial (SCBA). who require access to an alternative gas supply from a remote tank, surface supply or the main tank of a "buddy" partner, without disconnecting or disrupting the flow of gas. This type of transition is highly problematic and dangerous, especially when execution is required in toxic or zero visibility environments.

Furthermore, current designs do not allow for insertion of a tertiary gas supply (i.e. from an external tank, "buddy" or remote source). The design goal for the user whose gas supply has failed, is to have available a choice of multiple redundant gas supplies without need to first disconnect one source, before accessing an alternate. With the instant invention selection is simply made by rotating the Shaft/Knob into the right position, through which the supply will flow.

An example of this use is where a single source of air, is used to power a selection of pneumatic devices. By way of example only (and not limitation), said devices may be dental tools, mechanics tools, or even a multiple selection of air brushes such as those used by visual or makeup artists. Each tool is connected to a different "port". The single-port "in" source is directed through the Knob/Shaft, which is rotated by the user to direct the gas to exit and power the appropriate device. Furthermore, the Shaft/Knob may be rotated to a position where no multi-port "out" exists, thereby creating an "off" position, through which no media may flow.

Prior Art

U.S. Pat. No. 3,693,653 discloses a fluid (gas) mixing regulator for mixing two gases, using two regulator systems with a single control which can maintain a selected ratio of gases to the outlet at variable flow rates. FIG. 1 shows a manifold with two inlets and one outlet. Outlet selection is not rotational, does not direct the gas to pass internally through a rotatable selector knob, does not pass between the end of the selector shaft and the side of the shaft and does not allow simultaneous attachment/selection of a tertiary source.

U.S. Pat. No. 4,328,798 discloses a fire-fighter's breathing apparatus which allows for connection with a second mask to provide emergency air to a second user. Source selection does not direct the air to pass internally through a rotatable selector knob, does not pass between the end of the selector shaft and the side of the shaft and does not allow simultaneous attachment/selection of a tertiary source.

U.S. Pat. No. 4,392,490 Multiple Outlet Connection means for Self-Contained Positive Pressure or Demand Regulated Breathing Apparatus: shows a method by which to full face masked divers may share the air supply of a single diver. Air distribution does not direct the air to pass internally through a rotatable selector knob, does not pass between the end of the selector shaft and the side of the shaft and does not allow simultaneous attachment/selection of a tertiary source.

U.S. Pat. No. 4,449,524 discloses SCUBA including a demand valve for controlling gas flow, demand valve bypass means and allows providing emergency help to a second user by connecting his bypass valve to the first bypass orifice. Source selection does not direct the air to pass internally through a rotatable selector knob, does not pass between the end of the selector shaft and the side of the shaft and does not allow simultaneous attachment/selection of a tertiary source.

U.S. Pat. No. 4,838,256 discloses SCUBA with connections for underwater transfer of air from one user's tank to another's. In the figures, plug valve has four ports and two connection options. Source selection/distribution does not direct the air to pass internally through a rotatable selector knob, does not pass between the end of the selector shaft and the side of the shaft and does not allow simultaneous attachment/selection of a tertiary source.

U.S. Pat. No. 44,841,953 discloses SCUBA mask with connections for attachment of one alternate air source. Source selection does not direct the air to pass internally through a rotatable selector knob, does not pass between the end of the selector shaft and the side of the shaft and does not allow simultaneous attachment/selection of a tertiary source.

U.S. Pat. No. 5,273,030 discloses a chest-mounted pilot's terminal block assembly which couples breathing gas from a regulator to a breathing mask. A second outlet may couple to a chest vest. Emergency breathing gas (at high pressure) connects to the terminal block through a fixed orifice and a small diameter high pressure hose. Source selection does not direct the air to pass internally through a rotatable selector knob, does not pass between the end of the selector shaft and the side of the shaft and does not allow simultaneous attachment/selection of a tertiary source.

U.S. Pat. No. 5,293,864 Emergency Breathing Apparatus shows a gas manifold designed delivery primary source air to one of only two destinations. Destination selection does not direct the air to pass internally through a rotatable selector knob, does not pass between the end of the selector shaft and the side of the shaft and does not allow simultaneous attachment/selection of a tertiary source.

U.S. Pat. No. 5,411,018 Underwater Oxygen Supply System shows a main air supply and attached emergency back up air supply that feeds a gas manifold. The choice of air source is selectable by the diver. Source selection does not direct the air to pass internally through a rotatable selector knob, does not pass between the end of the selector shaft and the side of the shaft and does not allow simultaneous attachment/selection of a tertiary source.

U.S. Pat. No. 5,584,289 Breathing Apparatus Having a Flexible Manifold Connected Between a Plurality of Air Cylinders, shows two cylinders connected via High Pressure ("HP", 3,000 psi) hoses to a central HP manifold, that selects the air source for delivery to a first stage regulator. The system may also be used to connect an external LP air source post second stage, and not through the HP manifold. Source selection does not direct the air to pass internally through a rotatable selector knob, does not pass between the end of the selector shaft and the side of the shaft and does not allow simultaneous attachment/selection of a tertiary source.

U.S. Pat. No. 5,678,542 Decompression Gas Switching Manifold shows the use of a two, dual source switching manifolds connected together by a third selector manifold to allow selection of three different air sources deliverable to a diver. Source selection does not direct the air to pass internally through a rotatable selector knob, does not pass between the end of the selector shaft and the side of the shaft.

U.S. Pat. No. 6,070,577 Reserve Air for Underwater Diving shows a method of connecting and switching from a main air source to an attached redundant air source for emergency back up purposes. Source selection does not direct the air to pass internally through a rotatable selector knob, does not pass between the end of the selector shaft and the side of the shaft and does not allow simultaneous attachment/selection of a tertiary source.

U.S. Pat. No. 6,227,199 B1 Multiple Distributor for Low-Pressure Uses shows a method of distributing a single low pressure air source to a manifold, for delivery to alternate air using devices, including breathing air for the diver. Source selection does not direct the air to pass internally through a rotatable selector knob, does not pass between the end of the selector shaft and the side of the shaft and does not allow simultaneous attachment/selection of a tertiary source.

U.S. Pat. No. 6,513,525 Triplicate Diving Gas Valve Device is a single device that distributes air to a siren alarming device, life coat inflation and for diver breathing. Source selection does not direct the air to pass internally through a rotatable selector knob, does not pass between the end of the selector shaft and the side of the shaft and does not allow simultaneous attachment/selection of a tertiary source.

U.S. Pat. No. 7,168,428 B1 Apparatus for Connection Air Bottles shows a dual valve apparatus for transferring air from an external source to SCUBA or SCBA user to replenish air or provide an alternative source. Source selection does not direct the air to pass internally through a rotatable selector knob, does not pass between the end of the selector shaft and the side of the shaft and does not allow simultaneous attachment/selection of a tertiary source.

US Patent No 2008/014987 A heater Apparatus that can be configured to operate with either a first fuel at a first pressure or a second fuel at a second pressure or to direct a first fuel to a first passage way and with the controller in a first position and permit the flow of a second fuel to a second passage way. Source selection does not direct the fuel to pass internally through a rotatable selector knob, does not pass between the end of the selector shaft and the side of the shaft and does not allow simultaneous attachment/selection of a tertiary source.

U.S. Pat. No. 4,520,766 A method of selecting the delivery of two different fuels to an internal combustion engines, and more particularly to compression ignition engines which use both liquid and gas fuels. The method of source selection is not rotational through a selector knob, selection does not direct the fuel to pass internally through a rotatable selector knob, does not pass between the end of the selector shaft and the side of the shaft and does not allow simultaneous attachment/selection of a tertiary source.

US 2005/0022885 A multi-port diverter valve assembly with integral detent allows for the direction of a liquid from a mixing valve to one or more of a plurality of selectable outlets. Source selection does not direct the water to pass internally through a rotatable selector knob, does not pass between the end of the selector shaft and the side of the shaft.

SUMMARY OF MULTIPLE PORT DISTRIBUTION MANIFOLD

Application I: from Choice of Many to One

The invention is a quantum improvement and simplification in the design of systems for selectively routing media sources to one of a selected plurality destinations.

Feature 1: The invention allows for the rotational selection of one of a plurality of "in" ports from which the media will be internally redirected at a predetermined angle to a single "out" port.

Feature 2: The rotational selection is by a knob through which the media will internally flow through, that is attached to a hollow shaft. Said shaft has two openings: one on the exterior end, the other on the side surface. The Knob Shaft assembly functions both as selector and router of the media from the selected "in" port to the single "out" port.

Feature 3: A unique feature is that the media will pass internally through the selector knob, rather than externally bypassed.

Feature 4: The direction of the knob indicates which "in" port is selected as source.

Feature 5: The invention allows for an "off" selection position by rotation of the knob to a position which offers no "in" port.

Feature 6: The rotational selection is made accurate by an internally located spring/bearing assembly, which partially presses the bearing into a semi-circular indentation on the airshaft, for selective stoppage at each port or the off position.

Feature 7: The invention allows for the attachment of a variety of couplers or other source devices.

Application II: from One to Choice of Many

Where the flow of media is opposite of Application I, the user has the option of distributing the media "in" from the single Knob/Shaft assembly port to one of a plurality of "out" ports.

Feature 1: The invention allows for the rotational selection and internal redirection at a predetermined angle, of one of a plurality of "out" ports to which the media is routed from a single "in" port.

Feature 2: The rotational selection is by a knob through which the media will internally flow through, that is attached to a hollow shaft. Said shaft has two openings: one on the exterior end, the other on the side surface. The Knob Shaft assembly functions both as selector and router of the media from the single "in" port to one of a plurality of "out" ports.

Feature 3: A unique feature is that the media will pass internally through the selector knob, rather than externally bypassed.

Feature 4: The direction of the knob indicates which "out" port is selected

Feature 5: The invention allows for an "off" selection position by rotation of the knob to a position which offers no "out" port.

Feature 6: The rotational selection is made accurate by an internally located spring/bearing assembly, which partially presses the bearing into a semi-circular indentation on the airshaft, for selective stoppage at each port or the off position.

Feature 7: The invention allows for the attachment of a variety of couplers or other destination devices.

BRIEF DESCRIPTION OF THE DRAWINGS—FIGURES

FIG. 1: Side-Two (In/Out) Port Assembled
FIG. 2: Side-One (In/Out) Port Assembled
FIG. 3: Exploded View
FIG. 4: Sagittal View Assembled
FIG. 5: Sagittal View Assembled
FIG. 6: Exploded View Underside

DRAWINGS—REFERENCE NUMERALS

Part 1: Manifold
Part 2: Manifold Mounting Screws
Part 3: Hollow Shaft
Part 4: Port 1 (in/out)
Part 5: Port 2-4 (in/out)
Part 6: Bushing
Part 7: Bushing Mounting Screws
Part 8: Shaft Selector Bearing
Part 9: Shaft Selector Bearing Spring
Part 10: Selector Knob
Part 11: Selector Knob Set Screw
Part 12: Sealant Surface
Part 13 Manifold Mounting Screw Holes

DETAILED DESCRIPTION OF MULTIPLE PORT DISTRIBUTION MANIFOLD

General Description:

The Multiple Port Distribution Manifold (#1) consists of a Selector Knob (#10), connected to a rotatable Hollow Shaft (#3) that fits within a Manifold (#1). The Manifold has multiple selectable ports (#5) that intersect with the vertical Knob/Shaft assembly (#'s 4, 10). Four ports are shown in the current embodiment. More are possible. By rotating the Knob/Shaft assembly port (#4) said assembly may associate the single port (#4) with any one of the plurality ports (#5) at a predetermined angle relative to each other. The media is directed to pass internally through said Selector Knob, to which the Shaft is attached. The Manifold (#1) is mountable by retaining screws (#2) on its underside. The Shaft (#3) is retained within the Manifold (#1) by a Bushing (#6), secured by multiple Mounting Screws (#7) into the Manifold (#1). The Knob/Shaft (#'s 10, 3) assembly has multiple selectable positions to properly associate each in/out port, through the Knob/Shaft (#3). The selection is facilitated by a bearing/spring assembly (#'s 8, 9) that is housed horizontally within the Bushing (#6) or in some embodiments, the Manifold (#1). The Spring (#9) assembly exerts Bearing (#8) pressure against the Shaft. Appropriately placed indents within the Shaft (#3) allow the bearing (#8) to insert within and allow proper port-to-port alignment. The invention may be constructed of any suitable material, natural or synthetic, that is sufficiently strong to withstand both the internal pressures of the media as well as external environments and temperatures without rupture or leakage.

DESCRIPTION OF FIGURES

FIG. 4: Sagittal View Assembled: shows FIG. 3 as assembled for operation.

FIG. 5: Sagittal View Assembled: shows FIG. 3 as assembled for operation.

FIG. 6: Exploded View: shows FIG. 3 from underside perspective.

SUMMARY OF ADVANTAGES

Figures 1, 2:
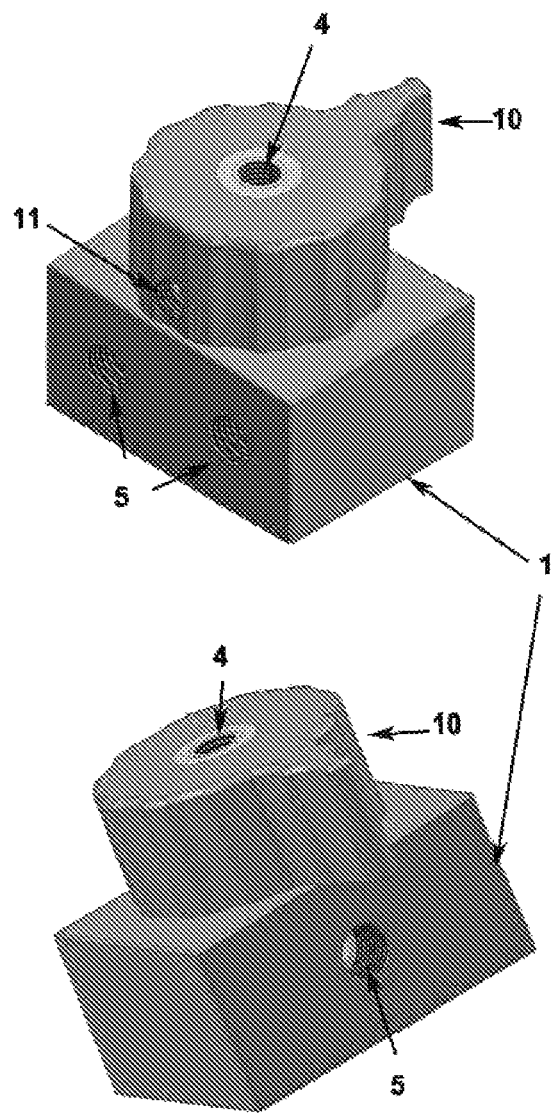
FIG. 1: Two Port Side View: Two (In/Out) Ports (#5) shown on one side of the Manifold. Said ports extend within the Manifold to intersect with the Shaft assembly.
FIG. 2: One Port Side View: One (In/Out) Port (#5) shown on one side of the Manifold. Said port extends within the Manifold to intersect with the Shaft assembly.
Figure 3:
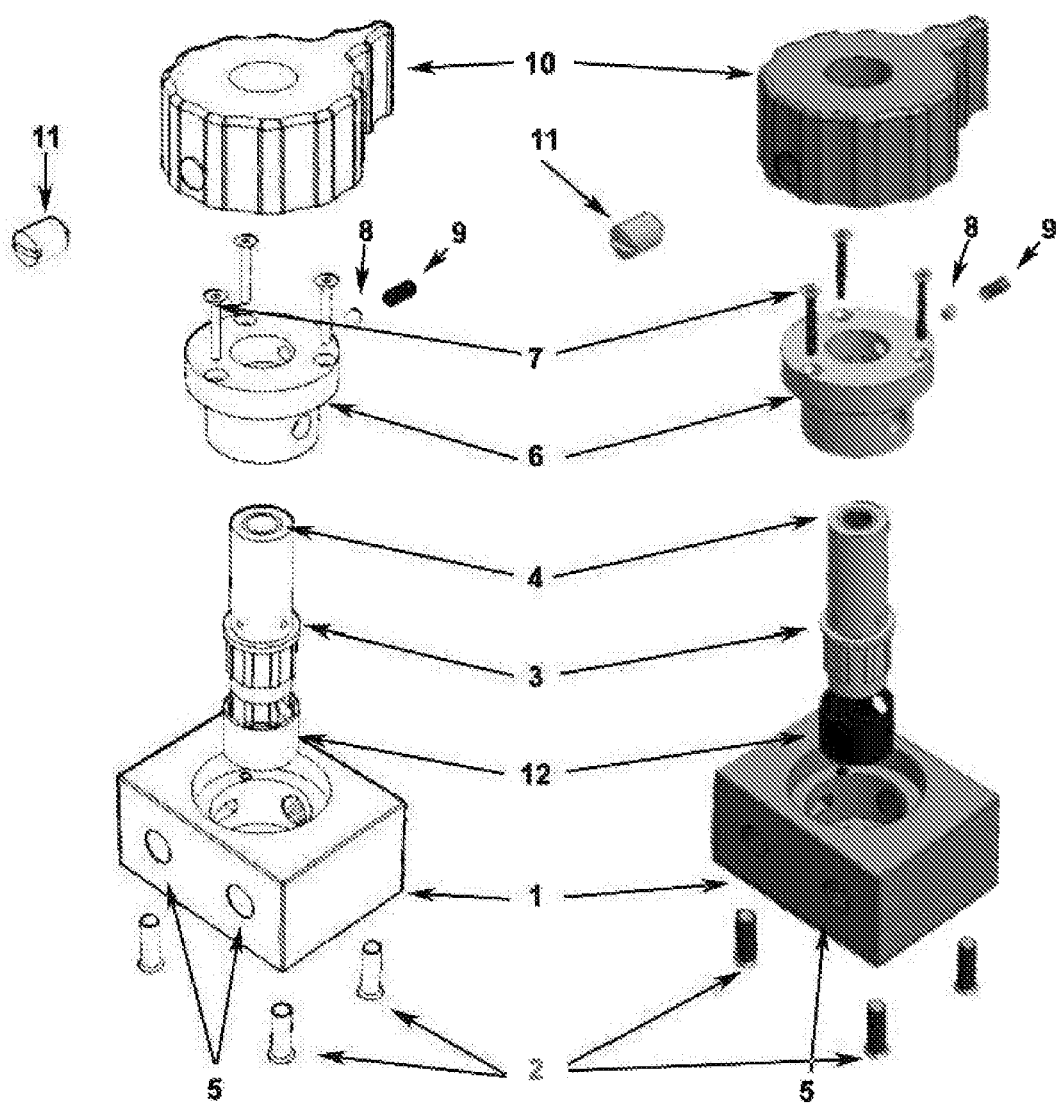
FIG. 3: Exploded View: shows the Sealant Surface (#12) upon the Shaft, (#3) that is inserted into the Bushing (#6) and held in location by the Bearing Spring assembly (#8,9) located internally within the Bushing (#6). The entire Shaft/Bushing (#'s 12, 3, 6) assembly is mounted within the Manifold (#1) with Mounting Screws (#7). The Knob (#10) inserts onto the rotatable Shaft (#3) and visually camouflages the internal assembly.

From the description and illustration of each embodiment of each component hereinabove, numerous advantages become evident:

The Multiple Port Distribution Manifold:
1) is simple in design, efficient in use and easy to manufacture with low level technology.
2) uniquely routes the media internally through [rather than externally to], the Selector Knob port, at a predetermined angle relative to the Multiple Ports, without use of external connectors or swivels.
3) is mountable to surfaces and other host.
4) is attachable to a variety of supply and destination hoses/devices.
5) is scalable to accommodate different media and flow rates.
6) is adaptable in structure and the materials from which it is manufactured as dictated by the requirements of its application.
7) may be fabricated from a vast array of materials including but not limited to: metals, plastics, synthetics, rubbers, carbons, composites as well as an array of natural and synthetic fabrics.

CONCLUSION, RAMIFICATIONS, AND SCOPE

Accordingly, the reader will see that a variety of applications are possible, depending upon the direction of flow, with the teachings of the various embodiments. Each offers an alternative set of advantages and anticipated uses.

OPERATION

The Multiple Port Distribution Manifold may be used in the following manner:

Application I: from Plurality to One

1. A single destination Port (#4) is associated with one of a plurality of source ports (#5) by rotation and direction of the media through the Knob/Shaft assembly (#'s 10, 3) as retained by a Bushing (#6) within the Manifold (#1)
2. Both destination Port (#4) and source ports (#5) are connectable to any device, hose or coupling.
3. Alternatively, the user rotates the Knob/Shaft/Sealant assembly (#'s 10,3,12) to a non-associated "off" position to stop the flow of media through the manifold.

Application II: from One to Plurality

1. A single source Port (#4) is associated with one of a plurality of source ports (#5) by rotation and direction of the media through the Knob/Shaft assembly (#'s 10, 3) as retained by a Bushing (#6) within the Manifold (#1)
2. Both destination Port (#4) and source ports (#5) are connectable to any device, hose or coupling.
3. Alternatively, the user rotates the Knob/Shaft/Sealant assembly (#'s 10,3,12) to a non-associated "off" position to stop the flow of media through the manifold.

SUMMARY OF THE INVENTION

In a first aspect, the present invention provides a distribution manifold of predetermined height, length and width that retains within a hollow, rotatable shaft through which a gas or liquid media may flow internally through the selector knob that communicates with the shaft, between an opening port on the end of the shaft and opening on the side of the shaft, that is selectably aligned with one of a plurality of ports within a manifold in a predetermined angle and direction. Said rotatable shaft is retained within the manifold by a bushing, whereby said shaft may rotate to align said side opening with any one of a plurality of predetermined ports located around the circumference of the manifold. Said shaft may also rotate to a position were no orifice exists, and thereby stop the flow of media. Said bushing and shaft are mounted within said manifold by a predetermined number of mounting screws. Said shaft has circular indents of predetermined size, depth and location around its circumference that communicate with a bearing that is pressurized against said shaft by a spring within said bushing or in some embodiments, within the manifold. A selector knob is affixed to shaft by a set screw, at a predetermined position, whereby the said shaft may be rotated to positions selectably determined by a spring that exerts pressure upon a bearing into indents spaced in predetermined locations around the circumference of the shaft. In some embodiments, a sealant material of predetermined density is affixed to the outer circumference of said shaft and rotatably communicates with the inner circumference of said bushing or said manifold, whereby said media is retained within said shaft and said selected orifice. The manifold is attachable to a user defined host surface or device by a predetermined number of mounting screws.

The invention provides a method of selectably routing a gas or liquid media between one orifice and a plurality of orifices within a manifold, whereby selection of one orifice is made from a plurality of choices by rotation of a knob, through which said media internally flows, to be connected to a hollow shaft through which said media may pass between said selected plurality orifice on the side of the shaft and one orifice located at the hollow open end of said shaft.

No other device or prior art describes the passing of the media internally through a rotatable selector knob and between an opening at one end of the connected shaft and the side surface of the shaft.

What I claim is:

1. A multiport distribution manifold for use both underwater SCUBA and terrestrial SCBA; said multiport distribution manifold comprising: a manifold, a selector knob, a rotatable hollow shaft, a bushing, and a detent assembly; said manifold having an exterior with a planar face, a central bore with a cylindrical shape, and a plurality of manifold ports; at least one of the plurality of manifold ports extend from said manifold exterior planar face to said manifold central bore, and said at least one of the plurality of manifold ports has an elongated slotted shape at an intersecting surface of said manifold central bore and said at least one of the plurality of manifold ports; and another of said plurality of manifold ports extend from said manifold exterior planar face to said manifold central bore; said manifold central bore houses said rotatable hollow shaft with an end opening port and a single side opening port, said rotatable hollow shaft communicates with a selector knob by which said rotatable hollow shaft may be rotated to align said single side opening port with one of said plurality of-manifold ports, and said rotatable hollow shaft has an outer circumference with circular indent cavities that communicate with said detent assembly, said detent assembly has a spring which presses a bearing against said rotatable hollow shaft, wherein said detent assembly inhibits rotational movement of said rotatable hollow shaft when said bearing is positioned within one of said circular indent cavities in said rotatable hollow shaft; said bushing has multiple pass through ports that align with said plurality of manifold ports, and said rotatable hollow shaft and said selector knob is housed in said bushing; wherein a gas or liquid media may flow from one of said plurality of manifold ports into said side opening port of said rotatable hollow shaft, through said selector knob, and through the end opening port of the rotatable hollow shaft; and to prevent a gas or liquid media to flow, said rotatable hollow shaft rotates to a position in which the side opening port of the rotatable hollow shaft faces a portion of the manifold where no ports exist.

2. The manifold of claim 1 wherein a predetermined number of mounting screws.

* * * * *